United States Patent
Uchida et al.

(10) Patent No.: US 6,485,810 B1
(45) Date of Patent: Nov. 26, 2002

(54) BIAXIALLY ORIENTED POLYESTER FILM AND FLEXIBLE DISK

(75) Inventors: Toshikazu Uchida, Sagamihara (JP); Toshifumi Osawa, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/581,090

(22) PCT Filed: Oct. 7, 1999

(86) PCT No.: PCT/JP99/05549

§ 371 (c)(1),
(2), (4) Date: Jun. 9, 2000

(87) PCT Pub. No.: WO00/21731

PCT Pub. Date: Apr. 20, 2000

(30) Foreign Application Priority Data

| Oct. 9, 1998 | (JP) | 10-287701 |
| Oct. 9, 1998 | (JP) | 10-287702 |
| Oct. 16, 1998 | (JP) | 10-295272 |

(51) Int. Cl.$^7$ ............................ B32B 27/20
(52) U.S. Cl. ............ 428/141; 428/323; 428/355 R; 428/694 SL; 428/694 SG; 428/336; 428/337; 428/409; 428/480; 428/331; 428/329; 428/327; 428/65.3
(58) Field of Search .......... 428/141, 323, 428/355 R, 402, 480, 910, 694 SL, 694 SG, 336, 337, 409, 331, 329, 327, 65.3

(56) References Cited

U.S. PATENT DOCUMENTS

| 4,745,019 A | * | 5/1988 | Posey et al. | 428/143 |
| 4,885,225 A | * | 12/1989 | Heller et al. | 430/143 |
| 5,051,292 A | * | 9/1991 | Katoh et al. | 428/141 |
| 5,322,886 A | * | 6/1994 | Sauterey | 524/707 |
| 5,374,462 A | * | 12/1994 | Funaki et al. | 428/141 |
| 5,380,577 A | | 1/1995 | Hamano et al. | |
| 5,415,930 A | * | 5/1995 | Etchu et al. | 360/134 |
| 5,439,738 A | * | 8/1995 | Chujo et al. | 428/332 |
| 5,489,566 A | * | 2/1996 | Dombrowski et al. | 503/207 |
| 5,545,713 A | * | 8/1996 | Krejci et al. | 428/480 |
| 5,631,063 A | * | 5/1997 | Chujo et al. | 428/141 |
| 5,705,551 A | * | 1/1998 | Sasaki et al. | 524/271 |
| 5,885,689 A | * | 3/1999 | Hasegawa et al. | 428/141 |
| 5,958,565 A | * | 9/1999 | Hattori et al. | 428/212 |

FOREIGN PATENT DOCUMENTS

| JP | 5-5039 | | 1/1993 |
| JP | 5-98053 | | 4/1993 |
| JP | 09-309190 A | * | 12/1997 |
| JP | 10-337775 | | 12/1998 |
| WO | 93-20553 | | 10/1993 |

OTHER PUBLICATIONS

English Translation of JP 09–309190–A (PTO 02–1145).*
JPO Abstract Translation of JP–09–309190–A (Clipped Image No. JP409309190A).*
Machine Translation of JP–09–309190–A.*
JP Abstract Translation of JP–07–101014–A (Clipped Image No. JP407101014A).*
JP Abstract Translations of JP–07–101018–A (Clipped Image No. JP407101018A).*
JP Abstract Translation of JP–07–101019–A (Clipped Image No. JP407101019A).*
International Search Report.
"Measurement and Evaluation Methods of Surface Roughness" by Jiro Nara, Sogo Gijutsu Center, 1983.
"Particle Size Measurement Technology", Nikkan Kogyo Press, pp. 242 to 147, 1975.

* cited by examiner

Primary Examiner—Stevan A. Resan
Assistant Examiner—Kevin M. Bernetz
(74) Attorney, Agent, or Firm—Sughrue Mion, PLLC

(57) ABSTRACT

A biaxially oriented polyester film which has a difference between refractive index on the front side and refractive index on the rear side of the film of 0 to 0.002, a heat shrinkage factor of 0 to 0.6% when it is heated at 105° C. for 30 minutes under no load, a Young's modulus of 4,609 MPa (470 kg/mm$^2$) or more and a difference between the maximum value and the minimum value of Young's modulus on the film plane of 981 MPa (100 kg/mm$^2$) or less, a center line average roughness on the film plane of 2 to 10 nm, and a static friction coefficient of 0.55 or less. A flexible disk having excellent electromagnetic conversion characteristics can be produced by forming an adhesive layer on both sides of the film and a magnetic layer on the adhesive layer.

22 Claims, No Drawings

BIAXIALLY ORIENTED POLYESTER FILM AND FLEXIBLE DISK

FIELD OF THE INVENTION

The present invention relates to a biaxially oriented polyester film and to a flexible disk comprising the same as a base film. More specifically, it relates to a biaxially oriented polyester film which has excellent handling properties and is free from a dimensional change when or after it is processed for use in a flexible disk and to a flexible disk which comprises the same as a base film and has excellent electromagnetic conversion characteristics.

RELATED ART

A biaxially oriented polyester film typified by a biaxially oriented polyethylene terephthalate film and a biaxially oriented polyethylene naphthalene dicarboxylate film is widely used as a base film for magnetic recording media due to its excellent physical and chemical properties. In recent years, an adhesive polyester film prepared by forming an adhesive layer on a biaxially oriented polyester film to improve its adhesion to a magnetic layer and simplify the production process of a magnetic recording medium (improving production efficiency) has been becoming the main stream of the market.

Meanwhile, along with the popularization of personal computers and the like, floppy disk drive units and floppy disks have been widely used as storage devices and the capacity and density of floppy disks have been increasing. Therefore, a base film having a more flat surface and better handling properties is now desired.

Further, due to the recent improvement of the performance of notebook type personal computers, personal computers equipped with a floppy disk drive and the like involve such a problem as high temperature inside the drive. Therefore, dimensional stability is an extremely important factor for a high-density magnetic recording medium.

A base film having a more flat surface is now in demand and the further improvement of blocking resistance is desired. In addition, along with an increase in the flatness of the surface of the base film, coating defects readily exert an influence upon the electromagnetic conversion characteristics of a magnetic tape. Accordingly, an adhesive polyester film free from coating defects and having excellent coatability is desired from the market.

SUMMARY OF THE INVENTION

It is an object of the present invention to provide a biaxially oriented polyester film which is flat, excellent in handling properties and free from a dimensional change when and after it is processed for use in a flexible disk.

It is another object of the present invention to provide a biaxially oriented polyester film which is useful as a base film for a flexible disk because its dimensional stability is not deteriorated by tension applied when a magnetic layer is formed.

It is still another object of the present invention to provide a biaxially oriented polyester film which has excellent adhesion, blocking resistance and coatability in addition to the above performance.

It is a further object of the present invention to provide a flexible disk which comprises the above biaxially oriented polyester film of the present invention as a base film and has excellent electromagnetic conversion characteristics.

Other objects and advantages of the present invention will become apparent from the following description.

According to the present invention, firstly, the above objects and advantages of the present invention are attained by a biaxially oriented polyester film which has:

(A) a difference between refractive index on the front side and refractive index on the rear side of the film of 0 to 0.002;

(B) a heat shrinkage factor of 0 to 0.6% when it is heated at 105° C. for 30 minutes under no load;

(C) a Young's modulus of 4,609 MPa (470 kg/mm$^2$) or more and a difference between the maximum value and the minimum value of Young's modulus on the film plane of 981 MPa (100 kg/mm$^2$) or less;

(D) a center line average roughness on the film plane of 2 to 10 nm; and (E) a static friction coefficient between the films of 0.55 or less.

According to the present invention, secondly, the above objects and advantages of the present invention are attained by a laminate polyester film consisting of the above biaxially oriented polyester film of the present invention and an adhesive layer which contains colloidal particles having an average particle diameter of 0 to 200 nm and resin components including a water-soluble or water-dispersible copolyester having a sulfonate group as the main component and which is formed on both sides of the above film.

Further, according to the present invention, thirdly, the above objects and advantages of the present invention are attained by a flexible disk comprising the above laminate polyester film of the present invention and magnetic layers formed on the adhesive layers on both side of the laminate polyester film.

DETAILED DESCRIPTION OF THE PREFERRED EMBODIMENT

The polyester forming the biaxially oriented polyester film of the present invention is a polyester which comprises an aromatic dicarboxylic acid as the main dicarboxylic acid component and an aliphatic glycol as the main glycol component. The polyester is substantially linear and has film formability, particularly film formability by melt molding.

Illustrative examples of the aromatic dicarboxylic acid include terephthalic acid, naphthalenedicarboxylic acid, isophthalic acid, diphenoxyethanedicarboxylic acid, diphenyldicarboxylic acid, diphenylether dicarboxylic acid, diphenylsulfonedicarboxylic acid, diphenyl ketone dicarboxylic acid, anthracenedicarboxylic acid and the like.

Illustrative examples of the aliphatic glycol include polymethylene glycols having 2 to 10 carbon atoms such as ethylene glycol, trimethylene glycol, tetramethylene glycol, pentamethylene glycol, hexamethylene glycol and decamethylene glycol; and alicyclic diols such as cyclohexane dimethanol.

The polyester used for the production of the biaxially oriented polyester film of the present invention preferably comprises an alkylene terephthalate and/or an alkylene naphthalene dicarboxylate as the main recurring ingredient.

Out of the polyesters, polyethylene terephthalate- and polyethylene-2,6-naphthalene dicarboxylate-based polyesters which are a homopolymer and copolymer comprising terephthalic acid and/or 2,6-naphthalenedicarboxylic acid in an amount of 80 mol % or more based on the total of all the dicarboxylic acid components and ethylene glycol in an amount of 80 mol % or more based on the total of all the glycol components are particularly preferred.

In the case of a copolymer, less than 20 mol % of the total of all the acid components may consist of any one of the above dicarboxylic acids other than terephthalic acid and/or 2,6-naphthalenedicarboxylic acid, for example, an aliphatic dicarboxylic acid such as adipic acid or sebacic acid, or an alicyclic dicarboxylic acid such as cyclohexane-1,4-dicarboxylic acid.

Less than 20 mol % of the total of all the glycol components may consist of any one of the above glycols other than ethylene glycol, for example, an aromatic diol such as hydroquinone, resorcin or 2,2-bis(4-hydroxyphenyl) propane; an aliphatic diol having an aromatic ring such as 1,4-dihydroxydimethylbenzene; or a polyalkylene glycol (polyoxyalkylene glycol) such as polyethylene glycol, polypropylene glycol or polytetramethylene glycol.

The polyester in the present invention comprehends a polyester prepared by copolymerizing an oxycarboxylic acid such as an aromatic oxyacid exemplified by hydroxybenzoic acid or aliphatic oxyacid exemplified by w-hydroxycaproic acid in an amount of 20 mol % or less based on the total of the dicarboxylic acid component and the oxycarboxylic acid component. When the amount of the oxycarboxylic acid is more than 20 mol %, the obtained film can be hardly used as a base film due to deterioration in its physical and chemical properties.

The polyester in the present invention further comprehends a polyester prepared by copolymerizing a polycarboxylic acid component having a functionality of 3 or more or a polyhydroxy compound component such as trimellitic acid or pentaerythritol in such an amount that it is substantially linear, for example, 2 mol % or less based on the total of all the acid components. When the amount of the polycarboxylic acid component or polyhydroxy compound component is more than 2 mol %, the characteristic properties of a linear polymer are impaired and the film formability of the polymer lowers.

The above polyester is known per se and can be produced by a known melt polymerization method. Preferably, the obtained polyester has an intrinsic viscosity measured at 35° C. in an o-chlorophenol solution of 0.4 to 0.9. When the intrinsic viscosity is lower than 0.4, the degree of polymerization is low, making it difficult to obtain desired physical properties. When the intrinsic viscosity is higher than 0.9, the degree of polymerization is high, making molding difficult.

The biaxially oriented polyester film of the present invention must have a difference between refractive index on the front side and refractive index on the rear side of the film of 0 to 0.002, preferably 0 to 0.001. When the difference is larger than 0.002, the obtained film is curled by curing after a magnetic layer is formed, thereby impairing the flatness of the obtained flexible disk. Thus, the flexible disk cannot be used.

The biaxially oriented polyester film must have a heat shrinkage factor of 0 to 0.6% when it is heated at 105° C. for 30 minutes under no load. The heat shrinkage factor is preferably 0 to 0.5%, more preferably 0 to 0.2%. When the heat shrinkage is larger than 0.6%, the heat shrinkage factor of a flexible disk after a magnetic layer is formed becomes large, thereby causing such a problem as a track shift.

The biaxially oriented polyester film must have a Young's modulus of 4,609 MPa (470 kg/mm$^2$) or more, preferably 4,904 MPa (500 kg/mm$^2$) or more, more preferably 5,590 MPa (570 kg/mM$^2$) or more. When the Young's modulus is smaller than 4,609 MPa (470 kg/mm$^2$), the heat shrinkage factor of the obtained flexible disk becomes larger than that of the base film because large stress is applied to the film by tension which is applied when a coating for forming a magnetic layer is applied, or the like. Further, the Young's modulus is preferably uniform on the film plane from the viewpoint of stiffness and the difference between the maximum value and the minimum value of Young's modulus must be 981 MPa (100 kg/mm$^2$) or less, preferably 686 MPa (70 kg/mm$^2$) or less.

The biaxially oriented polyester film of the present invention must have a center line average roughness (Ra) on the both sides of the film of 2 to 10 nm, preferably 3 to 10 nm. When the center line average roughness is smaller than 2 nm, the film is easily scratched extensively during its production process and when the center line average roughness is larger than 10 nm, recording output lowers disadvantageously. The term "center line average roughness" means a value obtained by measuring the surface of an adhesive layer when the adhesive layer is formed on the surface of the film.

Inert fine particles can be contained in the polyester forming the film to achieve the above center line average roughness. Preferably, first inert fine particles (A) having an average particle diameter of 0.01 to 0.5 μm are contained in the film in an amount of 0.1 to 0.5 wt % and second inert fine particles (B) having an average particle diameter of 0.1 to 1.0 μm are contained in the film in an amount of 0.001 to 0.1 wt %. The average particle diameter of the second inert fine particles (B) is larger than the average particle diameter of the first inert fine particles (A).

The average particle diameter of the first inert fine particles (A) is 0.01 to 0.5 μm, preferably 0.01 to 0.3 μm, more preferably 0.05 to 0.2 μm. When the average particle diameter is smaller than 0.01 μm, the slipperiness of the surface becomes unsatisfactory and when the average particle diameter is larger than 0.5 μm, recording output lowers disadvantageously. The content of the first inert fine particles (A) is suitably selected from a range of 0.1 to 0.5 wt % to obtain a predetermined surface roughness.

The average particle diameter of the second inert fine particles (B) is 0.1 to 1.0 μm, preferably 0.1 to 0.8 μm, more preferably 0.2 to 0.8 μm. When the average particle diameter is smaller than 0.1 μm, the slipperiness of the surface becomes unsatisfactory and when the average particle diameter is larger than 1.0 μm, recording output lowers disadvantageously. The content of the second inert fine particles (B) is suitably selected from a range of 0.001 to 0.1 wt % to achieve a predetermined friction coefficient. It is preferably 0.005 to 0.05 wt %.

The inert fine particles are preferably externally added particles. Internally precipitated particles are not preferred as main particles because it is difficult to control the particle size of the internally precipitated particles. Examples of the externally added particles include monodisperse particles and agglomerated particles such as calcium carbonate, colloidal silica, agglomerated silica, alumina and organic particles. Out of the monodisperse particles, colloidal silica and organic particles are preferred and spherical particles are more preferred as the main particles to achieve the reproducibility of surface roughness and reduce coarse protrusions.

The organic particles are preferably heat resistant polymer particles such as crosslinked divinylbenzene particles or crosslinked silicone particles.

The first inert fine particles and the second inert fine particles may be of the same chemical species or different chemical species.

The first inert fine particles are preferably at least one member selected from the group consisting of spherical silica particles and alumina particles. The second inert fine particles are preferably at least one member selected from the group consisting of heat resistant polymer particles and spherical silica particles.

When the first inert fine particles and the second inert fine particles are of the same chemical species, for example, spherical silica, it is desirable that the first inert fine particles and the second inert fine particles should differ from each other in the particle size peak value of a distribution curve.

When the first inert fine particles (A) and the second inert fine particles (B) are both spherical silica particles, the particle diameters of 99% or more of the spherical silica particles are preferably in the range of 0.5a to 2a (a is the average particle diameter of the spherical silica particles).

Further, the biaxially oriented polyester film of the present invention must have a static friction coefficient ($\mu$s) between films of 0.55 or less. The dynamic friction coefficient ($\mu$d) of the biaxially oriented polyester film is preferably 0.2 to 0.55. For example, when the handling properties of the film having a flat surface are poor in the film forming step or magnetic layer forming step, it is wrinkled or scratched while it is running over rolls or rolled in these steps.

Preferably, the biaxially oriented polyester film of the present invention has a curl value of 10 mm or less when measured after it is left at a temperature of 60° C. and a humidity of 50% for 24 hours. The curl value is more preferably 6 mm or less, much more preferably 3 mm or less. When the curl value is larger than 10 mm, the film is easily curled at the time of curing after a magnetic layer is formed, whereby the flatness of the obtained flexible disk may be impaired, and the contact of the flexible disk with the head may become nonuniform or the distance between the floating head and the flexibe disk may become nonuniform, thereby reducing output.

The biaxially oriented polyester. film of the present invention has a thickness of preferably 20 to 80 $\mu$m, more preferably 25 to 75 $\mu$m. This thickness is especially preferred for a high-density magnetic recording flexible disk. Further, the film has the above surface roughness. These satisfy requirements for a high-density recording system. When the thickness of the film is smaller than 20 $\mu$m, the rigidity of the film as a disk lowers and when the thickness is larger than 80 $\mu$m, the flexibility of the film becomes unsatisfactory for recording and reproduction with the magnetic head.

The biaxially oriented polyester film of the present invention is preferably produced in accordance with a known sequential biaxial stretching method but may be produced by a simultaneous biaxial stretching method or with a simple testing apparatus.

For example, the biaxially oriented polyester film can be produced by melt extruding a sufficiently dried polyester resin at a temperature of melting point to (melting point+ 70)° C., quenching the resin on a casting drum to produce an unstretched film, biaxially stretching the unstretched film sequentially or simultaneously and heat setting it.

Biaxial stretching is preferably sequential biaxial stretching. The unstretched film is stretched to 2.5 to 5.0 times in a longitudinal direction at a temperature of (Tg−10) to (Tg+70)° C. (Tg: secondary transition point of the polyester). Preferably, the stretching temperature is adjusted or the film is preheated before stretching at this point to ensure that the difference between the front surface temperature and the rear surface temperature of the film at the time of stretching should become 10° C. or less so that the difference of refractive index on the front side and refractive index on the rear side of the film becomes 0.002 or less.

Thereafter, the film is stretched to 2.5 to 5.0 times in a direction perpendicular to the above direction (transverse direction when the film was first stretched in a longitudinal direction) at a temperature of Tg(° C.) to (Tg+70)° C. In this case, the area draw ratio is preferably 9 to 22 times, more preferably 12 to 22 times.

The biaxially oriented film may be heat set at a temperature of (Tg+70)° C. to Tm(° C.). For example, a polyethylene terephthalate film is preferably heat set at 190 to 230° C. The heat setting time is 1 to 60 sec., for example. The stretching conditions in longitudinal and transverse directions are selected to ensure that the physical properties of the biaxially oriented polyester film in both directions should become almost the same, the Young's modulus in a plane direction should become 4,609 MPa (470 kg/mm$^2$) or more, and the difference between the maximum value and the minimum value of Young's modulus should become 981 MPa (100 kg/mm$^2$) or less. In the case of simultaneous biaxial stretching, the above stretching temperature, draw ratio, heat setting temperature and the like can be adopted.

Three-stage stretching or four-stage stretching may also be adopted that the biaxially oriented polyester film is further stretched in a longitudinal direction and/or transverse direction as required.

A description is subsequently given of a laminate polyester film provided by the present invention. This laminate polyester film comprises the above biaxially oriented polyester film of the present invention and an adhesive layer formed on both sides of the film. The adhesive layer contains colloidal particles having an average particle diameter of 10 to 200 nm and resin components mainly including a water-soluble or water-dispersible copolyester having a sulfonate salt group. Although this adhesive layer is aimed to improve adhesion to a magnetic layer formed thereon, it has slipperiness because it has colloidal particles on the surface.

The sulfonate salt group contained in the molecule of the above water-soluble or water-dispersible copolyester is preferably a group represented by the formula —SO$_3$M (M is a metal atom, ammonium group or quaternary amine having the same equivalent to that of —SO$_3$). The amount of the sulfonate salt group is preferably 5 to 18 mol %, more preferably 8 to 18 mol %, particularly preferably 9 to 12 mol % based on the total of all the dicarboxylic acid components. When the amount is smaller than 5 mol %, the water dispersibility and coatability of the copolyester are apt to deteriorate and when the amount is larger than 18 mol %, adhesion and blocking resistance are liable to lower.

To introduce the sulfonate salt group into the molecule of the polymer, a bifunctional compound having a sulfonate salt group, such as a dicarboxylic acid component having a sulfonate salt group exemplified by 5-Na sulfoisophthalic acid, 5-ammonium sulfoisophthalic acid, 4-Na sulfoisophthalic acid, 4-methylammonium isophthalic acid, 2-Na sulfoisophthalic acid, 5-K sulfoisophthalic acid, 4-K sulfoisophthalic acid or 2-K sulfoterephthalic acid, or a dihydroxy compound having a sulfonate salt group represented by the following general formula (1) or (2) is preferably used.

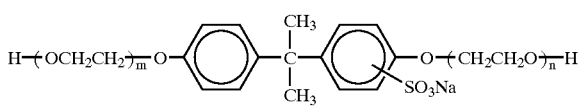

(1)

(m and n are an integer of 1 to 2, with the proviso that m+n is 2 to 4.)

(2)

(p and q are an integer of 1 to 2, with the proviso that p+q is 2 to 4.)

Out of these, dicarboxylic acid components having a sulfonate salt group are preferred and may be used in combination of two or more.

Illustrative examples of the acid component forming the above water-soluble or water-dispersible copolyester include terephthalic acid, isophthalic acid, phthalic acid, 2,6-naphthalenedicarboxylic acid, 4,4'-diphenyldicarboxylic acid, 1,4-cyclohexanedicarboxylic acid, adipic acid, sebacic acid, trimellitic acid, pyromellitic acid, dimeric acid and the like. They may be used in combination of two or more.

Further, an unsaturated polybasic acid such as maleic acid, fumaric acid or itaconic acid, or hydroxycarboxylic acid such as p-hydroxybenzoic acid or p-(β-hydroxyethoxy) benzoic acid may be used in a small amount. The amount of the unsaturated polybasic acid component or hydroxycarboxylic acid component is preferably 10 mol % or less, more preferably 5 mol % or less. When the amount is larger than 10 mol %, the chipping resistance and blocking resistance of the polyester resin lower.

Illustrative examples of the dihydroxy compound component forming the above water-soluble or water-dispersible copolyester include ethylene glycol, 1,4-butanediol, neopentyl glycol, diethylene glycol, triethylene glycol, propylene glycol, 1,6-hexanediol, 1,4-cyclohexane dimethanol, xylylene glycol, dimethylolpropionic acid, glycerin, trimethylol propane, poly(ethylene oxide)glycol, poly(tetramethylene oxide)glycol, bisphenol A adduct with alkylene oxide and the like. They may be used in combination of two or more.

The secondary transition point (DSC method) of the above water-soluble or water-dispersible copolyester is preferably 50 to 85° C., more preferably 60 to 80° C., much more preferably 65 to 75° C. When the secondary transition point is lower than 50° C., chipping resistance and blocking resistance are apt to lower and when the secondary transition point is higher than 850° C., adhesion or coatability are liable to lower.

The above water-soluble or water-dispersible copolyester can be produced by any methods known as polyester production methods. The types and amounts of the dicarboxylic acid component and the dihydroxy compound component can be suitably selected in consideration of the above-described characteristic properties of the polymer. The number average molecular weight of the copolyester can be freely selected but it is preferably 5,000 to 28,000. When the number average molecular weight is smaller than 5,000, the desirable characteristic properties of the polymer are hardly obtained, and chipping resistance and blocking resistance are apt to lower. When the number average molecular weight is larger than 28,000, it is difficult to form a uniform coating solution, and adhesion and coatability are liable to lower.

The adhesive layer may further contain a surfactant composed of a polyoxyethylene alkylphenyl ether having an HLB value of 11 to 20 as a resin component other than the above water-soluble or water-dispersible copolyester.

The above polyoxyethylene alkylphenyl ether surfactant is a polyoxyethylene nonylphenyl ether represented by the following general formula (3).

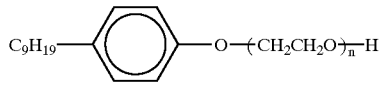

(3)

This compound has an HLB value of 12.6 when n is 8.5 and 17.1 when n is 30.

When the HLB value of the polyoxyethylene alkylphenyl ether surfactant is larger than 20, hydrophilic nature become too strong and the coatability of a coating solution is liable to lower and when the HLB value is smaller than 11, the characteristic properties of the interface become weak and the stability and coatability of the coating solution are apt to lower.

The polyoxyethylene alkylphenyl ether surfactant is preferably contained in an amount of 1 to 100 parts by weight based on 100 parts by weight of the water-soluble or water-dispersible copolyester.

When the amount of the above surfactant is smaller than 1 part by weight based on 100 parts by weight of the water-soluble or water-dispersible copolyester, the characteristic properties of the interface become slightly weak and the stability of the coating solution is apt to lower and when the amount is larger than 100 parts by weight, the content of the copolyester in the coating solution lowers with the result that adhesion tends to lower.

Another polyoxyethylene alkylphenyl ether having a different HLB value of 11 to 20 may be used in combination with the above polyoxyethylene alkylphenyl ether. The combination of polyoxyethylene alkylphenyl ethers is preferably a combination of a polyoxyethylene alkylphenyl ether having an HLB value of 11 to 13 and a polyoxyethylene alkylphenyl ether having an HLB value of more than 13 and 20 or less.

Particularly preferably, the above combination consists of 0.5 to 50 parts by weight of the polyoxyethylene alkylphenyl ether surfactant having an HLB value of 11 to 13 and 0.5 to 99.5 parts by weight of the polyoxyethylene alkylphenyl ether surfactant having an HLB value of 13 to 20 based on 100 parts by weight of the water-soluble and water-dispersible copolyester resin. The HLB value of the surfactant having an HLB value of 13 to 20 is preferably 13 to 19, more preferably 17 to 18.

Since the hydrophilic nature and lipophilic nature of the surfactant used are well balanced by this combination, a copolyester having excellent coatability as well as blocking resistance and adhesion can be obtained.

Further, the adhesive layer contains colloidal particles having an average particle diameter of 10 to 200 nm.

The average particle diameter of the colloidal particles is preferably 30 to 150 nm, more preferably 50 to 120 nm. When the average particle diameter is smaller than 10 nm, the particles are too small, thereby making it difficult to exhibit the effect of improving blocking resistance and the chipping resistance of the magnetic layer and when the average particle diameter is larger than 200 nm, the particles readily fall off and the chipping resistance of the base film is liable to deteriorate.

Preferably, the colloidal particles have a volume shape coefficient (f) represented by the following equation (4) of 0.4 to π/6:

$$f = V/D^3 \quad (4)$$

wherein f is a volume shape coefficient, V is the average volume of particles (m³), and D is the average maximum diameter (m) of the particles.

When the volume shape coefficient (f) is smaller than 0.4, the effect of improving blocking resistance and the chipping resistance of the magnetic layer is hardly exhibited in full.

The amount of the colloidal particles is preferably 5 to 150 parts by weight, more preferably 10 to 100 parts by weight, much more preferably 20 to 80 parts by weight based on 100 parts by weight of the above water-soluble or water-dispersible copolyester. When the amount is smaller than 5 parts by weight, the effect of improving blocking resistance is not exhibited in full and when the amount is larger than 150 parts by weight, the particles are liable to coagulate and the chipping resistance of the base film is apt to deteriorate.

Preferably, the thickness (nm) of the adhesive layer has the relationship represented by the following expression (5) with the average particle diameter (nm) of the colloidal particles.

0.2 ≤ (thickness of adhesive layer/average particle diameter of colloidal particles) ≤ 3.0 (5)

The relationship is more preferably represented by the following expression (6), particularly preferably the following expression (7).

0.4 ≤ (thickness of adhesive layer/average particle diameter of colloidal particles) ≤ 2.0 (6)

0.5 ≤ (thickness of adhesive layer/average particle diameter of colloidal particles) ≤ 1.5 (7)

When the value of (thickness of adhesive layer/average particle diameter of colloidal particles) is smaller than 0.2, the particles are readily chipped off and the chipping resistance of the base film is liable to deteriorate and when the value is larger than 3.0, the effect of improving blocking resistance and the chipping resistance of the magnetic layer is hardly exhibited in full.

The colloidal particles are preferably spherical silica particles or heat resistant polymer particles.

The spherical silica particles are as described above but the heat resistant polymer particles are preferably particles of a polymer having a 5% heat weight reduction temperature under a nitrogen gas atmosphere of 310° C. or more, more preferably 330° C. or more, particularly preferably 350° C. or more. Illustrative examples of the particles include crosslinked silicone resin particles, crosslinked acrylic resin particles, crosslinked polystyrene particles, Teflon particles, polyimide particles and the like. Out of these, crosslinked silicone resin particles and crosslinked acrylic resin particles are preferred and core-shell type particles are particularly preferred from the viewpoint of adhesion to a binder.

Preferably, the adhesive layer comprises 100 parts by weight of a water-soluble or water-dispersible copolyester, 1 to 100 parts by weight of a polyoxyethylene alkylphenyl ether having an HLB value of 11 to 20 and 5 to 150 parts by weight of colloidal particles having an average particle diameter of 10 to 200 nm.

A coating solution for forming the adhesive layer, preferably an aqueous solution may contain as required other resin, antistatic agent, lubricant, filler, colorant, ultraviolet light absorber, antioxidant, surfactant, crosslinking agent such as melamine, epoxy or aziridine compound for improving the heat resistance and blocking resistance of an adhesive. The aqueous coating solution may contain a small amount of an organic solvent.

The solids content of the coating solution may be determined optionally but is preferably 1 to 15 wt %, more preferably 1 to 12 wt %, more preferably 1 to 10 wt %.

The amount of wet coating is preferably 0.5 to 20 g, more preferably 1 to 10 g per 1 m² of the running film (uniaxially stretched film) and the thickness of a dried coating film is preferably 5 to 200 nm, more preferably 10 to 100 nm.

Any known coating methods may be employed. For example, roll coating, gravure coating, reverse coating, roll brushing, spray coating, air knife coating, impregnation and curtain coating may be used alone or in combination.

The coating solution may be applied to the biaxially oriented polyester film but is preferably applied to a longitudinally stretched polyester film.

The uniaxially stretched polyester film to which an aqueous coating solution has been applied is dried, stretched in a transverse direction, stretched again in a longitudinal direction as required and introduced to the following heat setting step. For example, the longitudinally stretched polyester film to which the aqueous coating solution has been applied is introduced to a stenter to be stretched in a transverse direction, stretched in a longitudinal direction again as required and heat set. During this, the coating solution is dried to form a continuous coating film on the film. Drying may be carried out before or after stretching in a transverse direction.

The biaxially oriented polyester film and the laminate polyester film having an adhesive layer on both sides of the present invention are advantageously used as a base film for a flexible disk.

According to the present invention, there is provided a flexible disk comprising the laminate polyester film of the present invention and a magnetic layer formed on the adhesive layer on both sides of the laminate polyester film.

Technologies known per se may be used for the magnetic layer and forming the same may be used.

The following examples are provided for the purpose of further illustrating the present invention but are in no way to be taken as limiting. "Parts" and "%" in the following examples or comparative examples are based on weight unless otherwise stated. The physical property values and characteristic properties in the present invention were measured in accordance with the following methods.

(1) difference between refractive index on front side and refractive index on rear side of film.

The refractive index of the film is measured using sodium D-rays (589 nm) as a light source, Abbe refractometer and methylene iodide as an intermediate solution. The refractive indices on the front and rear sides of the film are obtained by sampling 18 films at a pitch of 10° from a certain direction on the film plane, for example, a longitudinal direction and measuring refractive indices on the front and rear sides of each sample in the same direction. When the difference between refractive index on the front side and refractive index on the rear side of the film measured as described above is in the range of 0 to 0.002 in all of the 18 samples, all the samples satisfy the difference of refractive index in the present invention. The largest difference of refractive index between the front and rear sides is the largest out of the values obtained by the above measurement.

(2) heat shrinkage factor

An about 30 cm (width)×30 cm (length) film whose size has been measured accurately is suspended in an oven heated at 105° C., retained under no load for 30 minutes, taken out from the oven and returned to room temperature to measure its size.

The heat shrinkage factor is defined by the following equation.

heat shrinkage factor=$(\Delta L/L_0) \times 100$ $\Delta L=|L_0-L|$ ($L_0$ is the length of the film before a heat treatment and L is the length in the same direction of the film after the heat treatment)

The heat shrinkage factor of the present invention is satisfied when a value obtained by sampling 6 films at a pitch of 30° from every direction on the film plane, for example, the longitudinal direction of the film and measuring each sample as described above is in the range of 0 to 0.6%.

(3) Young's modulus

The Young's modulus of the film is measured by setting a film sample having a width of 10 mm and a chuck interval of 100 mm in a tensile tester and pulling it at 23° C., 65%RH and a pulling rate of 200 mm/min.

The Young's modulus of the present invention is satisfied when a value obtained by sampling 18 films at a pitch of 10° C. from every direction on the film plane, for example, the longitudinal direction of the film and measuring each sample as described above is 4,609 MPa (470 kg/mm$^2$) or more. When the difference between the maximum value and the minimum value of Young's modulus measured for each sample is 981 MPa (100 kg/mm$^2$) or less, the difference of Young's modulus in the present invention is satisfied.

(4) film surface roughness (center line average surface roughness Ra)

The surface roughness of the film is measured with the tracer type surface roughness meter of Kosaka Kenkyusho Co., Ltd. at a tracer load of 80 mg, a measurement length of 4 mm and a cut-off of 0.25 mm. The definition of Ra is given in "Measurement And Evaluation Methods Of Surface Roughness" written by Jiro Nara (published by Sogo Gijutsu Center in 1983), for example.

(5) static friction coefficient ($\mu$s), dynamic friction coefficient ($\mu$d)

A load of 200 g (W: g) is placed on two cut films (samples) measuring 75 mm (width)×100 mm (length), the upper film is caused to travel at a speed of 150 mm/min, and the static friction coefficient ($\mu$s) is calculated from tensile force (Fs: g) when the film begins to travel and the dynamic friction coefficient ($\mu$d) is calculated from force (Fd: g) when the film is traveling based on the following equations.

$\mu s=Fs(g)/W(g)$ $\mu d=Fd(g)/W(g)$

The film sample has been left at 23° C. and 65%RH for 24 hours.

(6) total thickness of film 10 films are placed one upon another so that dust is not contained therein and the thickness of the 10 films is measured with an intermittent electronic micrometer to calculate the thickness of each film.

(7) curl value

A 8.9 mm-diameter (3.5 inches) circular sample is left at a temperature of 60° C. and a humidity of 50% for 24 hours, taken out and left at room temperature (humidity of 50%) for 1 hour. The gap between the edge portion of the film and a vertical axis when the sample is suspended perpendicularly is measured.

This measurement is carried out at a pitch of 10° in a circumferential direction and the maximum value is taken as a curl value (unit was mm) (measured clockwise with a longitudinal direction taken as 0°).

(8) handling properties

The wrinkling of the film caused by poor slipperiness over pass rolls is judged based on the following criteria.

◯: no practical problem

X: film is wrinkled, causing practical problem (9) secondary transition point

The secondary transition point of a polyester is obtained by measuring with DSC at a temperature elevation rate of 20° C./min.

(10) average particle diameter of particles

This is measured using the CP-50 Centrifugal Particle Size Analyzer (trade name) of Shimadzu Corporation. A particle diameter equivalent to 50 mass percent is read from the cumulative curve of the particles of each diameter and the amount thereof calculated based on the obtained centrifugal sedimentation curve and taken as the above average particle diameter (refer to "Particle Size Measurement Technology" issued by Nikkan Kogyo Press, pp. 242–247, 1975).

(11) adhesion (evaluation of MAG scratches)

The following "evaluation magnetic coating" is applied to the coating surface of a sample film with a Meyer's bar to ensure that the thickness of the coating film after drying should become about 4 $\mu$m and dried at 100° C. for 3 minutes. Thereafter, the coating film is aged at 60° C. for 24 hours. "evaluation magnetic coating" (1) 30 parts of a polyester resin (Vilon 20SS (trade name) of Toyobo Co., Ltd.), (2) 10 parts of a vinyl chloride-vinyl acetate resin (Eslec A (trade name) of Sekisui Chemical Co., Ltd.), (3) 3 parts of a dispersant (Lecion P (trade name) of Riken Vitamin Co., Ltd.) and (4) 260 parts of a magnetizing agent (CTX-970 (trade name) of Toda Kogyo Co., Ltd.) in terms of solid matter are dissolved in a mixed solvent of methyl ethyl ketone, toluene and methyl isobutyl ketone to prepare a 30% solution and dispersed with a sand grinder for 2 hours. Thereafter, 12 parts of a crosslinking agent (Colonate L (trade name) of Nippon Polyurethane Co., Ltd.) in terms of solid matter is added to the dispersion and stirred well to obtain a magnetic coating.

A surface coated with the thus obtained magnetic coating is scratched with a scratch tester covered with fibers having high rigidity (registered trademark "Kevlar" yarn) under a load of 1 kg to evaluate scratches on the surface coated with the magnetic coating. This evaluation method corresponds well with scratches (MAG scratches) on the magnetic surface after the formation of a magnetic layer in the production of a magnetic medium.

<Criteria>

⊚: MAG does not peel off at all

◯: MAG peels off slightly

X: MAG peels off significantly

(12) coatability

The adhesive layer formed surface of the film is observed with the eye to evaluate coating nonuniformity.

<Criteria>

⊚: almost no coating nonuniformity is seen

◯: slight coating nonuniformity is seen

X: coating nonuniformity is large

(13) blocking resistance

After two polyester films having an adhesive layer on both sides are placed one upon the other and left at a temperature of 60° C. and a humidity of 80%RH under a load of 14.7 MPa (150 kg/cm$^2$) for 65 hours, the peel strength of the two films is measured with a tensile tester and evaluated.

<Criteria>

⊚: peel strength is 0 to 10 g/10 cm
○: peel strength is 11 to 20 g/10 cm
Δ: peel strength is 21 to 30 g/10 cm
X: peel strength is 31 g/10 cm to breakage

EXAMPLE 1

Production of Copolyester Resin 90 parts of dimethyl 2,6-naphthalene dicarboxylate, 6 parts of dimethyl isophthalate, 4 parts of 5-sodium sulfoisophthalic acid, 70 parts of ethylene glycol and 30 parts of a bisphenol A adduct with propylene oxide represented by the following structural formula were charged into an ester exchange reactor, and 0.05 parts of tetrabutoxy titanium was added and heated by controlling the temperature to 230° C. under a nitrogen atmosphere to carry out an ester exchange reaction while the formed methanol was distilled off.

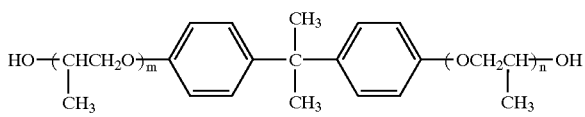

(m+n=4 (average value))

Thereafter, 0.6 part of Irganox 1010 (Ciba Geigy Co., Ltd.) was added to this reaction system and a polycondensation reaction was carried out by gradually elevating the temperature to 255° C. and reducing the pressure inside the system to 133 Pa (1 mmHg) to obtain a copolyester resin having an intrinsic viscosity (o-chlorophenol, 35° C.) of 0.64.

Preparation of Polyester Water Dispersion 20 parts of this copolyester resin was dissolved in 80 parts of tetrahydrofuran, and 180 parts of water was added dropwise to the obtained solution at a high agitation speed of 10,000 rpm to obtain a bluish semitranslucent dispersion. This dispersion was distilled at a reduced pressure of 2,666 Pa (20 mmHg) to distill off tetrahydrofuran. Thus, a polyester water dispersion having a solid content of 10 wt % was obtained.

An aqueous coating solution (solid content of 1.8 wt %) comprising 100 parts of the thus obtained polyester water dispersion, 10 parts of crosslinked acryl particles having an average particle diameter of 50 nm and 14 parts of polyoxyethylene nonylphenyl ether as a surfactant was prepared.

Production of Polyester Film

Dimethyl-2,6-naphthalate and ethylene glycol were polymerized in accordance with a commonly used method by adding manganese acetate as an ester exchange catalyst, antimony trioxide as a polymerization catalyst, phosphorous acid as a stabilizer, and 0.3 wt % of spherical silica particles having an average particle diameter of 0.1 μm and 0.005 wt % of spherical silica particles having an average particle diameter of 0.5 μm as lubricants to obtain polyethylene-2,6-naphthalate (PEN) having an intrinsic viscosity (orthochlorophenol, 35° C.) of 0.61.

The pellets of this polyethylene-2,6-naphthalate were dried at 170° C. for 6 hours, supplied to the hopper of an extruder, molten at a melting temperature of 280 to 300° C., passed through a die to be subjected to a surface finishing of about 0.3s and extruded over a rotary cooling drum having a surface temperature of 60° C. to obtain an unstretched film having a thickness of 750 μm.

The thus obtained unstretched film was preheated at 120° C., stretched to 3.5 times by heating with IR heaters having surface temperatures of 900° C. and 800° C. from 15 mm above and below the film between low-speed and high-speed rolls to adjust the front surface temperature of the film to 145° C. and the rear surface temperature of the film to 150° C. at the time of stretching and cooled, and then the above prepared coating solution was applied to one side of the uniaxially stretched film to 30 nm in a dry state. The unstretched film was then supplied to a stenter to be stretched to 3.6 times in a transverse direction at 145° C. The obtained biaxially oriented film was heat set with 240° C. hot air for 10 seconds to obtain a biaxially oriented polyester film having a thickness of 60 μm.

The characteristic properties of the obtained film are shown in Table 1.

EXAMPLE 2

Dimethyl terephthalate and ethylene glycol were polymerized in accordance with a commonly used method by adding manganese acetate as an ester exchange catalyst, antimony trioxide as a polymerization catalyst, phosphorous acid as a stabilizer, and 0.3 wt % of spherical silica particles having an average particle diameter of 0.1 μm and 0.005 wt % of spherical silica particles having an average particle diameter of 0.5 μm as lubricants to obtain polyethylene terephthalate having an intrinsic viscosity (orthochlorophenol, 350° C.) of 0.62.

The pellets of this polyethylene terephthalate were dried at 170° C. for 3 hours, supplied to the hopper of an extruder, molten at a melting temperature of 280 to 300° C., passed through a 1 mm slit die to be subjected to a surface finishing of about 0.3s and extruded over a rotary cooling drum having a surface temperature of 20° C. to obtain an unstretched film having a thickness of 780 μm.

The thus obtained unstretched film was preheated at 75° C., stretched to 3.5 times by heating with IR heaters having surface temperatures of 750° C. and 700° C. from 15 mm above and below the film between low-speed and high-speed rolls to adjust the front and the rear surfaces temperature of the film to 90° C. at the time of stretching, cooled, coated with the same coating solution as in Example 1 in the same manner as in Example 1, and then supplied to a stenter to be stretched to 3.6 times in a transverse direction at 115° C. The obtained biaxially oriented film was heat set at 240° C. for 10 seconds to obtain a biaxially oriented polyester film having a thickness of 60 μm.

The characteristic properties of the obtained film are shown in Table 1.

COMPARATIVE EXAMPLE 1

A biaxially oriented polyester film was obtained in the same manner as in Example 1 except that when the unstretched film was stretched in a longitudinal direction, the film was heated with IR heaters having surface temperatures of 1,000° C. and 700° C. from above and below to adjust the front surface temperature of the film to 155° C. and the rear surface temperature of the film to 130° C. at the time of stretching.

The characteristic properties of the obtained film are shown in Table 1. Since there was a difference in refractive index between the front and rear sides of the film, the film was curled and could not be used in a high-density magnetic recording medium.

COMPARATIVE EXAMPLE 2

A biaxially oriented polyester film was obtained in the same manner as in Example 1 except that the spherical silica particles having an average particle diameter of 0.5 μm were not added at the time of polymerizing a polyester.

The characteristic properties of the obtained film are shown in Table 1. It had a high friction coefficient and poor handling properties.

COMPARATIVE EXAMPLE 3

A biaxially oriented polyester film was obtained in the same manner as in Example 1 except that the spherical silica particles having an average particle diameter of 0.1 μm were not added at the time of polymerizing a polyester and the amount of the spherical silica particles having an average particle diameter of 0.5 μm was changed to 0.1 wt %.

The characteristic properties of the obtained film are shown in Table 1. Its surface was too rough, thereby making it unsuitable for use in a high-density magnetic recording disk.

COMPARATIVE EXAMPLE 4

Dimethyl terephthalate and ethylene glycol were polymerized in accordance with a commonly used method by adding manganese acetate as an ester exchange catalyst, antimony trioxide as a polymerization catalyst, phosphorous acid as a stabilizer, and 0.3 wt % of spherical silica particles having an average particle diameter of 0.1 μm and 0.005 wt % of spherical silica particles having an average particle diameter of 0.5 μm as lubricants to obtain polyethylene terephthalate having an intrinsic viscosity (orthochlorophenol, 35° C.) of 0.62.

The pellets of this polyethylene terephthalate were dried at 170° C. for 3 hours, supplied to the hopper of an extruder, molten at a melting temperature of 280 to 300° C., passed through a 1 mm slit die to be subjected to a surface finishing of about 0.3s and extruded over a rotary cooling drum having a surface temperature of 20° C. to obtain an unstretched film having a thickness of 780 μm.

The thus obtained unstretched film was preheated at 75° C., stretched to 3.6 times by heating with IR heaters having surface temperatures of 750° C. and 700° C. from 15 mm above and below the film between low-speed and high-speed rolls to adjust the front and the rear surfaces temperature of the film to 90° C. at the time of stretching, cooled, coated with the same coating solution as in Example 1 in the same manner as in Example 1, and then supplied to a stenter to be stretched to 3.7 times in a transverse direction at 115° C. The obtained biaxially oriented film was heat set at 210° C. for 10 seconds to obtain a biaxially oriented polyester film having a thickness of 60 μm.

The characteristic properties of the obtained film are shown in Table 1. Its heat shrinkage factor was too large, thereby making it unsuitable for use in a high-density magnetic recording disk.

EXAMPLE 3

Dimethyl terephthalate and ethylene glycol were polymerized in accordance with a commonly used method by adding manganese acetate as an ester exchange catalyst, antimony trioxide as a polymerization catalyst, phosphorous acid as a stabilizer, and 0.01% of spherical silica having an average particle diameter of 0.3 μm and 0.3% of spherical silica having an average particle diameter of 0.12 μm as inert particles to obtain polyethylene terephthalate (PET) having an intrinsic viscosity (orthochlorophenol, 35° C.) of 0.62 dl/g.

The pellets of this polyethylene terephthalate were dried at 170° C. for 3 hours, supplied to the hopper of an extruder, molten at a melting temperature of 280 to 300° C., passed through a 1 mm slit die to be subjected to a surface finishing of about 0.3s and extruded over a rotary drum having a surface temperature of 20° C. to obtain an unstretched film having a thickness of 780 μm.

The thus obtained unstretched film was preheated at 75° C., stretched to 3.5 times by heating with IR heaters having surface temperatures of 750° C. and 700° C. from 15 mm above and below the film between low-speed and high-speed rolls to adjust the front and rear surfaces temperature of the film to 90° C. at the time of stretching and quenched. Then, an aqueous coating solution (solid content: 6.0%) comprising 100 parts of a terephthalic acid-5-Na sulfoisophthalic acid (11 mol %)-ethylene glycol-diethylene glycol copolyester resin (secondary transition point (Tg)=70° C.), 70 parts of colloidal silica having an average particle diameter of 80 nm, and 2 parts of polyoxyethylene nonylphenyl ether having an HLB of 12.6 and 60 parts of polyoxyethylene nonylphenyl ether having an HLB of 17.1 as a surfactant was applied to both sides of the uniaxially oriented film with a reverse coater to ensure that the thickness of a coating film after biaxially orienting and drying should become 80 nm (solid content) and stretched to 3.6 times in a transverse direction at 115° C. The obtained biaxially oriented film was heat set at 240° C. for 10 seconds to obtain a biaxially oriented polyester film having a thickness of 62 μm. The characteristic properties of the obtained film are shown in Table 5.

EXAMPLES 4 TO 9

Biaxially oriented polyester films were obtained in the same manner as in Example 3 except that the type and particle diameter of the inert particles in Example 3 were changed as shown in Table 2 and the composition of the aqueous coating solution and the thickness of the coating layer were changed as shown in Table 3 and Table 4. The characteristic properties of these films are shown in Table 5.

COMPARATIVE EXAMPLE 5

A biaxially oriented polyester film was obtained in the same manner as in Example 3 except that the surface temperatures of the upper and lower IR heaters were set to 900° C. and 500° C. and the front surface temperature and the rear surface temperature of the film were set to 100° C. and 80° C. at the time of stretching, respectively, to stretch the obtained unstretched film in a longitudinal direction. The characteristic properties of the obtained biaxially oriented polyester film are shown in Table 5.

COMPARATIVE EXAMPLE 6

A biaxially oriented polyester film was obtained in the same manner as in Example 3 except that the draw ratio of the film in a longitudinal direction was changed to 3.6 times, the draw ratio in a transverse direction was changed to 3.7 times, and the heat setting temperature was changed to 210° C.

The characteristic properties of the obtained biaxially oriented polyester film are shown in Table 5.

EXAMPLE 10

Polyethylene-2,6-naphthalate (PEN) containing 0.03% of crosslinked silicone resin particles having an average particle diameter of 0.5 μm and 0.8% of spherical silica particles having an average particle diameter of 0.12 μm and having an intrinsic viscosity (orthochlorophenol, 25° C.) of 0.62 dl/g was dried at 170° C. and then melt extruded through a 10 μm-mesh filter at 300° C., and solidified by quenching on a casting drum maintained at 60° C. to obtain an unstretched film having a thickness of 780 μm.

This unstretched film was stretched to 3.5 times by heating with IR heaters having surface temperatures of 900° C. and 800° C. from 15 mm above and below the film between two rolls having different speeds to adjust the front and rear surfaces temperature of the film to 145° C. at the time of stretching and quenched. Then, an aqueous coating solution (solid content: 6.0%) comprising 100 parts of a terephthalic acid-5-Na sulfoisophthalic acid (11 mol %)-ethylene glycol-diethylene glycol copolyester resin (secondary transition point (Tg)=70° C.), 70 parts of colloidal silica having an average particle diameter of 80 nm, and 2 parts of polyoxyethylene nonylphenyl ether having an HLB of 12.6 and 60 parts of polyoxyethylene nonylphenyl ether having an HLB of 17.1 as a surfactant was applied to both sides of the uniaxially oriented film with a reverse coater to ensure that the thickness of a coating film after biaxially orienting and drying should become 80 nm (solid content) and stretched to 3.6 times in a transverse direction at 140° C. The obtained biaxially oriented film was heat set at 240° C. for 10 seconds to obtain a biaxially oriented polyester film having a thickness of 62 μm. The characteristic properties of the obtained film are shown in Table 5.

TABLE 1

| | polyester film | heat shrinkage factor (%) | | Young's modulus upper figure: MPa (lower figure: kg/mm²) | | maximum difference of refractive index between front and rear sides | Ra (nm) | friction coefficient | | curl value (mm) | handling properties |
|---|---|---|---|---|---|---|---|---|---|---|---|
| | | maximum value | minimum value | maximum value | minimum value | | | μs | μd | | |
| Ex. 1 | PEN | 0.2 | 0.1 | 6865 (700) | 6571 (670) | 0.001 | 5.5 | 0.40 | 0.40 | 2 | ○ |
| Ex. 2 | PET | 0.4 | 0.3 | 5394 (550) | 4904 (500) | 0.001 | 5.1 | 0.45 | 0.43 | 2 | ○ |
| C. Ex. 1 | PEN | 0.2 | 0.1 | 6865 (700) | 6375 (650) | 0.003 | 5.5 | 0.40 | 0.40 | 6 | ○ |
| C. Ex. 2 | PEN | 0.2 | 0.1 | 6865 (700) | 6571 (670) | 0.001 | 2.0 | 0.65 | 0.51 | 2 | x |
| C. Ex. 3 | PEN | 0.2 | 0.1 | 6865 (700) | 6571 (670) | 0.001 | 11.0 | 0.30 | 0.20 | 2 | ○ |
| C. Ex. 4 | PET | 0.8 | 0.5 | 6375 (650) | 5590 (570) | 0.001 | 5.1 | 0.42 | 0.40 | 3 | ○ |

PEN: polyethylene-2,6-naphthalate
PET: polyethylene terephthalate

TABLE 2

| | | inert particles | | | | | |
|---|---|---|---|---|---|---|---|
| | | particle A | | | particle B | | |
| | polyester film | type | average particle diameter (nm) | amount (%) | type | average particle diameter (nm) | amount (%) |
| Ex. 3 | PET | spherical silica particles | 0.3 | 0.01 | spherical silica particles | 0.12 | 0.30 |
| Ex. 4 | PET | spherical silica particles | 0.3 | 0.01 | spherical silica particles | 0.12 | 0.30 |
| Ex. 5 | PET | spherical silica particles | 0.3 | 0.01 | spherical silica particles | 0.12 | 0.30 |
| Ex. 6 | PET | spherical silica particles | 0.3 | 0.15 | — | — | — |
| Ex. 7 | PET | spherical silica particles | 0.3 | 0.15 | — | — | — |
| Ex. 8 | PET | spherical silica particles | 0.12 | 0.30 | — | — | — |
| Ex. 9 | PET | crosslinked silicone resin particles | 0.5 | 0.03 | Alumina particles | 0.15 | 0.2 |
| Ex. 10 | PEN | crosslinked silicone resin particles | 0.5 | 0.03 | spherical silica particles | 0.12 | 0.8 |
| C. Ex. 5 | PET | spherical silica particles | 0.3 | 0.01 | spherical silica particles | 0.12 | 0.30 |
| C. Ex. 6 | PET | spherical silica particles | 0.3 | 0.01 | spherical silica particles | 0.12 | 0.30 |

PEN: polyethylene-2,6-naphthalate
PET: polyethylene terephthalate

TABLE 3

| | adhesive layer | | | | | | | |
|---|---|---|---|---|---|---|---|---|
| | (A) aqueous polyester resin | | | | (B) surfactant | | (C) colloidal particle | |
| | acid components | glycol components | amount of sulfonate salt group (mol %) | secondary transition point (C. °) | type I (HLB) | type II (HLB) | type | average particle diameter (NM) |
| Ex. 3 | TA/SI | EG/DEG | 11 | 70 | 12.6 | 17.1 | spherical silica particles | 80 |
| Ex. 4 | TA/SI | EG/DEG | 11 | 70 | 12.6 | — | spherical silica particles | 80 |
| Ex. 5 | TA/SI | EG/DEG | 11 | 70 | — | 17.1 | spherical silica particles | 80 |
| Ex. 6 | TA/SI | EG/DEG | 11 | 70 | 12.6 | 17.1 | closslinked acrylic resin particles | 40 |
| Ex. 7 | TA/SI | EG/DEG | 11 | 70 | 12.6 | 17.1 | closslinked acrylic resin particles | 40 |
| Ex. 8 | TA/SI | EG/DEG | 11 | 70 | 12.6 | 17.1 | spherical silica particles | 80 |
| Ex. 9 | TA/IA/SI | EG/DEG | 7 | 60 | 12.6 | 17.1 | spherical silica particles | 80 |
| Ex. 10 | TA/SI | EG/DEG | 11 | 70 | 12.6 | 17.1 | spherical silica particles | 80 |
| C. Ex. 5 | TA/SI | EG/DEG | 11 | 70 | 12.6 | 17.1 | spherical silica particles | 80 |
| C. Ex. 6 | TA/SI | EG/DEG | 11 | 70 | 12.6 | 17.1 | spherical silica particles | 80 |

| acid components | TA: terephthalic acid | glycol components | EG: ethylene glycol |
|---|---|---|---|
| | IA: isophthailc acid | | DEG: diethylene glycol |
| | SI: 5-Na sulfoisophthalic acid | | |

TABLE 4

| | composition of solid matter | | | | | |
|---|---|---|---|---|---|---|
| | | (B) surfactant | | (C) colloidal particle | | |
| | (A) aqueous polyester resin | surfactant I (parts) | surfactant II (parts) | amount (parts) | coating thickness (solid content) (nm) | coating/average particle thickness diameter of colloidal particles |
| Ex. 3 | 100 | 2 | 60 | 70 | 80 | 1.00 |
| Ex. 4 | 100 | 8 | — | 46 | 80 | 1.00 |
| Ex. 5 | 100 | — | 59 | 68 | 80 | 1.00 |
| Ex. 6 | 100 | 2 | 60 | 70 | 80 | 2.00 |
| Ex. 7 | 100 | 3 | 26 | 128 | 40 | 1.00 |
| Ex. 8 | 100 | 2 | 8 | 47 | 40 | 0.50 |
| Ex. 9 | 100 | 2 | 60 | 70 | 80 | 1.00 |
| Ex. 10 | 100 | 2 | 60 | 70 | 80 | 1.00 |
| C. Ex. 5 | 100 | 2 | 60 | 70 | 80 | 1.00 |
| C. Ex. 6 | 100 | 2 | 60 | 70 | 80 | 1.00 |

TABLE 5

| polyester film | heat shrinkage factor maximum value | heat shrinkage factor minimum value | Young's modulus upper figure: MPa, lower figure: kg/mm² maximum value | Young's modulus upper figure: MPa, lower figure: kg/mm² minimum value | maximum difference of refractive index between front and rear sides | Ra (nm) | friction coefficient μs | friction coefficient μd | curl value (mm) | blocking resistance | adhesion (MAG scratches) | coatability |
|---|---|---|---|---|---|---|---|---|---|---|---|---|
| Ex. 3 | PET | 0.4 | 0.3 | 5394 (550) | 4904 (500) | 0.001 | 3.0 | 0.45 | 0.43 | 2 | ⊚ | ○ | ⊚ |
| Ex. 4 | PET | 0.4 | 0.3 | 5394 (550) | 4904 (500) | 0.001 | 3.0 | 0.46 | 0.44 | 2 | Δ | ○ | ○ |
| Ex. 5 | PET | 0.4 | 0.3 | 5394 (550) | 4904 (500) | 0.001 | 3.0 | 0.45 | 0.43 | 2 | ⊚ | ○ | ○ |
| Ex. 6 | PET | 0.4 | 0.3 | 5394 (550) | 4904 (500) | 0.001 | 4.8 | 0.46 | 0.43 | 2 | ○ | ○ | ⊚ |
| Ex. 7 | PET | 0.4 | 0.3 | 5394 (550) | 4904 (500) | 0.001 | 4.8 | 0.45 | 0.43 | 2 | ⊚ | ○ | ○ |
| Ex. 8 | PET | 0.4 | 0.3 | 5394 (550) | 490 (500) | 0.001 | 2.8 | 0.45 | 0.43 | 2 | ○ | ⊚ | ○ |
| Ex. 9 | PET | 0.4 | 0.3 | 5394 (550) | 4904 (500) | 0.001 | 5.0 | 0.45 | 0.43 | 2 | ○ | ○ | ○ |
| Ex. 10 | PEN | 0.2 | 0.1 | 6865 (700) | 6571 (670) | 0.001 | 8.0 | 0.45 | 0.43 | 2 | ⊚ | ○ | ⊚ |
| C. Ex. 5 | PET | 0.4 | 0.3 | 5394 (550) | 4904 (500) | 0.004 | 3.0 | 0.45 | 0.43 | 7 | ⊚ | ○ | ⊚ |
| C. Ex. 6 | PET | 0.8 | 0.5 | 6375 (650) | 5590 (570) | 0.001 | 3.0 | 0.45 | 0.43 | 3 | ⊚ | ○ | ⊚ |

PEN: polyethylene-2,6-naphthalate
PET: polyethylene terephthalate

As is obvious from the results of Tables 1 to 5, the biaxially oriented polyester film of the present invention has excellent adhesion, blocking resistance and coatability and is useful as a high-density magnetic recording medium having excellent dimensional stability. Particularly when it is used as a base film for a high-density magnetic recording disk, it rarely experiences a dimensional change and has excellent handling properties in spite of its flat surface.

The biaxially oriented polyester film for a flexible disk such as a floppy disk of the present invention has excellent dimensional stability and excellent characteristic properties as a film for a magnetic recording medium.

According to the present invention, a base film having excellent dimensional stability can be obtained and further an adhesive polyester film having excellent adhesion, blocking resistance and coatability and excellent characteristic properties as a base film for a flexible disk can be obtained by selecting compounds having specific interface properties and forming a coating layer comprising these on surface of the base film as an adhesive layer containing an aqueous polyester resin comprising 5 to 18 mol % of a sulfonate salt group in the molecule and having a secondary transition point of 50 to 85° C. and specific colloidal particles.

What is claimed is:

1. A biaxially oriented polyester film which has:
   (A) a difference between the refractive index on the front side and the refractive index on the rear side of the film of 0 to 0.002;
   (B) a heat shrinkage factor of 0 to 0.6% when it is heated at 105° C. for 30 minutes under no load;
   (C) a Young's modulus of 4,609 MPa (470 kg/mm²) or more and a difference between the maximum value and the minimum value of Young's modulus on the film plane of 981 MPa (100 kg/mm²) or less;
   (D) a center line average roughness on the film plane of 2 to 10 nm; and
   (E) a static friction coefficient of 0.55 or less, which biaxially oriented polyester film contains 0.1 to 0.5 wt % of first inert fine particles having an average particle diameter of 0.01 to 0.5 μm and 0.001 to 0.1 wt % of second inert fine particles having an average particle diameter of 0.1 to 1.0 μm which is larger than the average particle diameter of the first inert fine particles; and wherein the first inert fine particles and the second inert fine particles are of the same chemical specifies and differ from each other in the particles diameter peak value of the distribution curve of the first inert fine particles and the second inert fine particles.

2. The biaxially oriented polyester film of claim 1 which has a thickness of 20 to 80 μm.

3. The biaxially oriented polyester film of claim 1, wherein the first inert fine particles are at least one member selected from the group consisting of spherical silica particles and alumina particles.

4. The biaxially oriented polyester film of claim 1, wherein the second inert fine particles are at least one member selected from the group consisting of crosslinked polymer particles and spherical silica particles.

5. The biaxially oriented polyester film of claim 1 which has a curl value of 10 mm or less when measured after it is maintained at a temperature of 60° C. and a humidity of 50% for 24 hours.

6. The biaxially oriented polyester film of claim 1, wherein a polyester as a raw material of the film is an aromatic polyester comprising terephthalic acid as the main acid component and ethylene glycol as the main glycol component.

7. Use of the biaxially oriented polyester film of claim 1 as a base film for a flexible disk for a magnetic recording medium.

8. The biaxially oriented polyester film of claim 1, wherein the first inert fine particles and the second inert fine particles are both spherical silica.

9. The biaxially oriented polyester film of claim 8, wherein 99 wt % or more of the first inert fine particles have a particle diameter 0.5 to 2 times the average particle diameter of the first inert fine particles and 99 wt % or more of the second inert fine particles have a particle diameter 0.5 to 2 times the average particle diameter of the second inert fine particles.

10. The biaxially oriented polyester film of claim 1, wherein a polyester as a raw material of the film is an aromatic polyester comprising naphthalene-2,6-dicarboxylic acid as the main acid component and ethylene glycol as the main glycol component.

11. The biaxially oriented polyester film of claim 10 which has a heat shrinkage factor of 0 to 0.2% when it is heated at 105° C. for 30 minutes under no load.

12. The biaxially oriented polyester film of claim 10 which has a Young's modulus of 5,590 MPa (570 kg/mm$^2$) or more and a difference between the maximum value and the minimum value of Young's modulus on the film plane of 981 MPa (100 kg/mm$^2$) or less.

13. A laminate polyester film comprising the biaxially oriented polyester film of claim 1 and an adhesive layer which contains colloidal particles having an average particle diameter of 10 to 200 nm and resin components mainly including a water-soluble or water-dispersible copolyester having a sulfonate salt group and is formed on both sides of the film.

14. The laminate polyester film of claim 13, wherein the colloidal particles are selected from the group consisting of spherical silica and crosslinked polymer particles.

15. The laminate polyester film of claim 13, wherein the relationship represented by the following expression (1) is established between the average particle diameter (nm) of the colloidal particles and the thickness (nm) of the adhesive layer:

$$0.2 \leq (\text{thickness of adhesive layer/average particle diameter of colloidal particles}) \leq 3.0 \quad (1).$$

16. The laminate polyester film of claim 13, wherein the water-soluble or water-dispersible copolyester contains a sulfonate salt group in the molecule thereof in an amount of 5 to 18 mol % based on the total of all the dicarboxylic acid components and has a secondary transition temperature of 50 to 85° C.

17. The laminate polyester film of claim 13, wherein the adhesive layer comprises 100 parts by weight of a water-soluble or water-dispersible copolyester, 1 to 100 parts by weight of a polyoxyethylene alkylphenyl ether having an HLB value of 11 to 20 and 5 to 150 parts by weight of colloidal particles having an average particle diameter of 10 to 200 nm.

18. Use of the laminate polyester film of claim 13 as a base film for a flexible disk for a magnetic recording medium.

19. A flexible disk for a magnetic recording medium comprising the laminate polyester film of claim 13 and a magnetic layer formed on the adhesive layers on the front and rear sides of the laminate polyester film.

20. The laminate polyester film of claim 13, wherein the adhesive layer further contains a surfactant composed of a polyoxyethylene alkylphenyl ether having an HLB value of 11 to 20.

21. The laminate polyester film of claim 20, wherein the surfactant consists of a polyoxyethylene alkylphenyl ether having an HLB value of 11 to 13 and a polyoxyethylene alkylphenyl ether having an HLB value of more than 13 and 20 or less.

22. The laminate polyester film of claim 21, wherein the polyoxyethylene alkylphenyl ether having an HLB value of 11 to 13 is contained in an amount of 0.5 to 50 parts by weight and the polyoxyethylene alkylphenyl ether having an HLB value of more than 13 and 20 or less is contained in an amount of 0.5 to 99.5 parts by weight, the parts by weight being based on 100 parts by weight of the water-soluble or water-dispersible copolyester.

* * * * *